June 29, 1926.                                                   1,590,866
A. TESKE
ENSILAGE SPREADER FOR SILOS
Filed Feb. 26, 1926
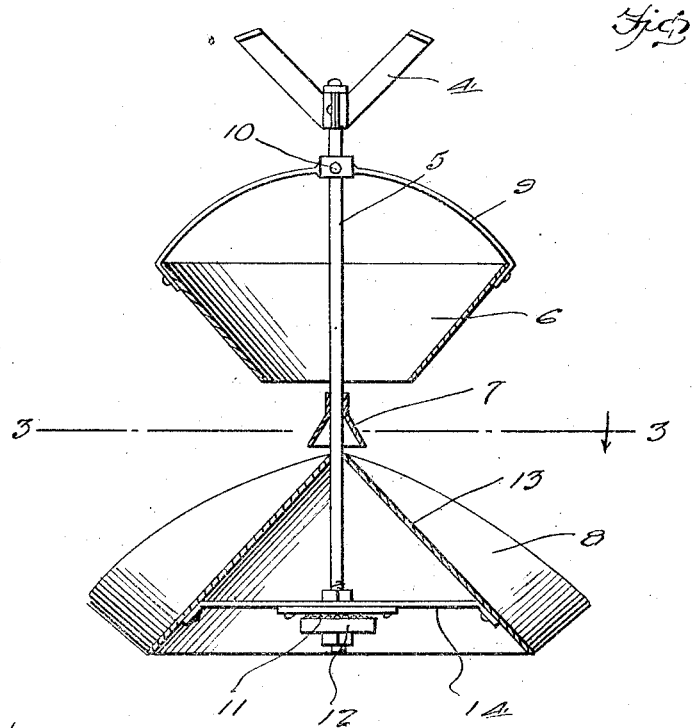
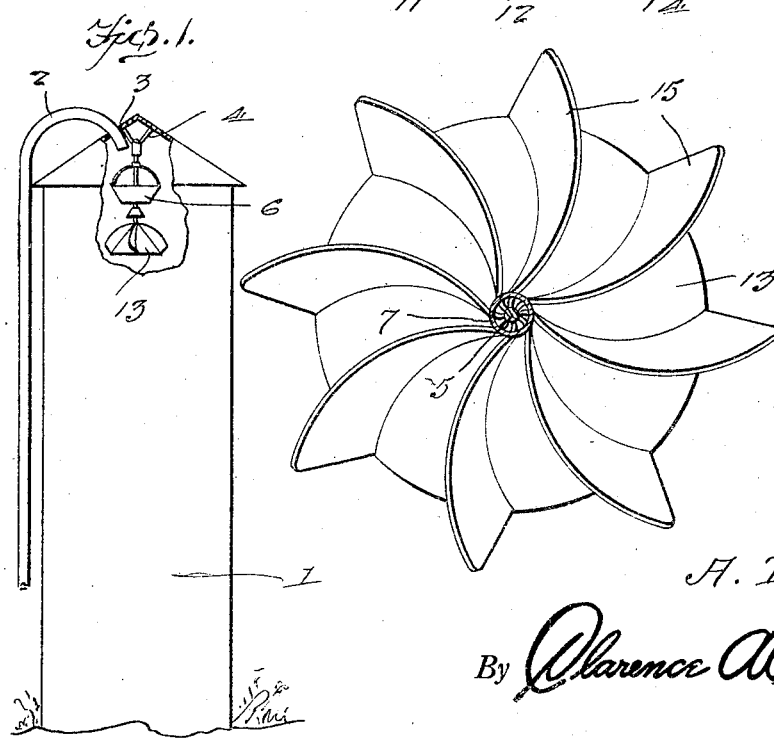
Inventor
A. Teske
By Clarence A O'Brien
Attorney Patented June 29, 1926.

1,590,866

UNITED STATES PATENT OFFICE.

ALBERT TESKE, OF BUTTERNUT, WISCONSIN.

ENSILAGE SPREADER FOR SILOS.

Application filed February 26, 1926. Serial No. 90,802.

My present invention has to do with the placing of ensilage in silos, and contemplates the provision of an efficient device adapted for use in the upper portion of a silo and constructed with a view to efficiently and advantageously spread ensilage supplied to the upper end of the silo.

To the attainment of the foregoing, the invention consists in the improvement as hereinafter described and definitely claimed.

In the accompanying drawings, forming part of this specification:—

Figure 1 is a view illustrating the arrangement of my improvement in the upper portion of a silo.

Figure 2 is an enlarged detail diametrical section of my novel spreader per se.

Figure 3 is a horizontal section taken in the plane indicated by the line 3—3 of Figure 2, looking downwardly.

Similar numerals of reference designate corresponding parts in all of the views of the drawings.

I show in Figure 1 a silo 1, and a pipe or conduit 2 for delivering ensilage to the upper portion of the silo, the said conduit 2 being shown as extending through an opening 3 in the silo cap.

In the preferred embodiment of my invention my novel spreader is suspended from the apex portion of the silo cap or top, and the said spreader comprises a hanger 4, a shaft or rod 5 carried by and depending from the hanger 4, a funnel 6 disposed to receive ensilage from the discharge end of the conduit 2, a preliminary spreader member 7, and a secondary and major spreader member 8, the spreader member 7 being disposed immediately under the funnel 6, and the spreader 8 being immediately below the member 7. The funnel 6 is connected to a bail or other appropriate hanging means 9 with the shaft 5, said hanging means 5 being attached to the shaft 5 at the point 10. The preliminary spreader 7 is preferably fixed in any approved manner to the shaft 5, while the secondary and major spreader 8 is free to turn about the shaft 5, being superposed upon ball bearings 11, which bearings in turn, are superposed upon a race or enlargement 12 secured upon the lower portion of the shaft 5. In addition to a conical body 13 braced in appropriate manner at 14, the major spreader 8 comprises a plurality of blades 15 that are arranged upon the outer side of the conical portion 13 and extend from the center or from points adjacent to the center of the spreader 8 to the outer edge of the conical body or portion 13.

Manifestly when ensilage delivered in the manner indicated or in any other appropriate manner gravitates through the funnel 6, the said ensilage by the action of the primary or preliminary spreader 7 and the secondary or major spreader 8 will be distributed in efficient manner throughout the transverse area of the interior of the silo, and it will also be noted that the gravitating ensilage by cooperation with the blades 15 will bring about rotation of the secondary spreader 8 which rotation will contribute materially to the proper and thorough distribution of the ensilage.

The practical advantages of my novel device will be fully appreciated when it is stated that the device is calculated to spread ensilage evenly throughout the transverse area of the silo, and this more efficiently than can be accomplished by hand. Moreover my novel spreader obviates the necessity of employing men in the silo, no tramping or camping of the ensilage in the silo being necessary, and the liability of light ensilage being delivered to the side portion of the silo while the heavier ensilage remains in the middle of the silo is averted. This latter feature is particularly advantageous because when light ensilage alone is delivered to the side portion of the silo, poor feeding material is the result.

It will be apparent from the foregoing that my novel device notwithstanding the capacity of function ascribed to it, is simple and inexpensive in construction, is susceptible of ready installment, and this without the employment of skilled labor, and, as a whole is well adapted to withstand the usage to which silo appurtenances are ordinarily subjected.

The specific construction illustrated and described is the best practical construction of which I am cognizant and is therefore preferred. I do not desire, however, to be understood as limiting myself to the precise construction and relative arrangement of parts as disclosed, my invention being defined by my appended claim within the scope of which changes in structure and in arrangement may be made without departure from my invention.

Having described my invention, what I claim and desire to secure by Letters-Patent, is:—

An ensilage spreader for use in the upper portion of a silo, comprising a hanger, a shaft connected with and pendent from said hanger, a funnel carried by said shaft, and spreading means also carried by the shaft and disposed below said funnel; the said spreading means comprising a primary spreader carried by the shaft and located immediately below the funnel, and a secondary and major spreader in the form of a rotor, mounted on ball bearings on the shaft and made up of a conical body and blades on said body and disposed to enable the gravitating ensilage to maintain the rotor in motion.

In testimony whereof I affix my signature.

ALBERT TESKE.